United States Patent Office 3,249,652
Patented May 3, 1966

3,249,652
SEGMENTED COPOLYESTER OF 2,2,4,4-TETRA-METHYL-1,3-CYCLOBUTYLENE TEREPHTHAL-ATE AND ETHYLENE TEREPHTHALATE
Richard Keith Quisenberry, Kinston, N.C., assignor to E. I. du Pont de Nemours and Company, Wilmington, Del., a corporation of Delaware
No Drawing. Filed Oct. 24, 1962, Ser. No. 232,879
1 Claim. (Cl. 260—860)

This invention relates to linear condensation copolyesters, and more particularly to novel segmented copolyesters which exhibit good dyeability and which are resistant to alkaline hydrolysis.

In recent years synthetic linear condensation polyesters have achieved wide commercial acceptance for use in fibers, films, and other shaped articles, owing to their high tensil strength and other desirable properties. Fabrics produced from fibers of the synthetic linear condensation polyesters have been noted for their adaptabily for "ease-of-care" garments requiring only occasional touch-up ironing. Considerable effort has been expended toward improving the properties of the polyesters still further, and particularly toward improving their dyeability, since as a class the polyesters dye much less readily than do the natural fibers. It has been observed that copolyesters dye more readily than the corresponding homopolyesters. Unfortunately, however, copolyesters tested up to the present time have generally also exhibited lower melting points as well as poorer tensile properties and other properties.

An object of this invention, therefore, is to provide novel synthetic linear condensation copolyesters of improved properties, suitable for shaping into filaments and films. Another object is to provide filaments and films of such copolyesters which exhibit good dyeability, superior resistance to alkaline hydrolysis, and other desirable properties. Other objects will appear as the description of the invention proceeds.

It has now been found that the desired properties are exhibited by a novel segmented linear copolyester having an inherent viscosity of at least about 0.3 and comprised of alternating first and second polyester segments connected through ester linkages, said first polyester segment consisting essentially of a succession of 3 to about 200 recurring structural units of a glycol ester of a dicarboxylic acid represented by the following Formula I:

$$-O-G-O\overset{O}{\underset{\|}{C}}-A-\overset{O}{\underset{\|}{C}}-$$

said second polyester segment being different from the first and consisting essentially of a succession of from 3 to about 200 recurring structural units of a 2,2,4,4-tetramethyl-1,3-cyclobutylene glycol ester of a dicarboxylic acid represented by the following Formula II:

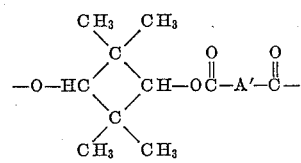

wherein G is a saturated hydrocarbon radical of 2 to 20 carbon atoms which is free from alkyl substituents, and A and A' are the same or dfferent radicals of primarily hydrocarbon composition containing from 2 to 20 carbon atoms and free from aliphatic unsaturation, which may contain halogen or chalkogen as non-hydrocarbon components; the over-all ratio by weight of the ester units of Formula I to the ester units of Formula II being in the range 60/40 to 95/5. Preferably, the ester units of Formula I contain at least one 6-membered carbocyclic ring in the ester chain to separate the adjacent carbonyloxy

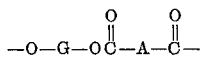

ester linkages by at least 4 ring carbon atoms.

In one embodiment of the invention, polyester "blocks" are prepared separately in accordance with conventional polycondensation procedures, followed by melt blending of the polymers thus formed, with subsequent additional polymerization of the melt blend if desired. In one reaction vessel, the glycol dicarboxylate polyester of Formula I is prepared. Suitable examples of glycols which may be employed include ethylene glycol, trimethylene glycol, tetramethylene glycol, decamethylene glycol, 1,3-cyclobutanedimethanol, 1,4-cyclohexane-β,β' diethanol, 1,3 - cyclobutanedimethanol, 1,4 - cyclohexanedimethanol, decahydro - 2,6 - bis(hydroxymethyl)naphthalene, bis (4-hydroxymethylcyclohexyl), and 1,2-bis(4-hydroxymethylcyclohexyl)ethane. Suitable examples of dicarboxylic acids which may be employed includes succinic acid, adipic acid, azelaic acid, sebacic acid, terephthalic acid, 4,4'-dibenzoic acid, chloroterephthalic acid, fluroro-terephthalic acid, bromoterephthalic acid, iodotherephthalic acid, sulfonyl-4,4-dibenzoic acid, 2,6-naphthalenedicarboxylic acid, 2,8 - dibenzofurandicarboxylic acid, decahydro - 2,6 - naphthalenedicarboxylic acid, 1,3 - cyclopentanedicarboxylic acid, bis(4 - carboxyphenyl)ether, bis(4-carboxyphenyl)ketone, and stilbenture of acids may be employed, the term "polyesters" being intended to include copolyesters.

The glycol dicarboxylate polyester may be prepared directly from the dicarboxylic acid, or an ester-forming derivative of the dicarboxylic acid may be used, i.e., an acid halide, a salt, its anhydride, or an ester thereof, particularly an ester of the dicarboxylic acid with a lower aliphatic alcohol or with phenol. Correspondingly, an ester-forming derivative of the glycol may be employed, i.e., a derivative of the glycol containing functional groups equivalent to the hydroxyl groups in their ability to react with carboxyl groups. Thus, the glycol may be employed in the form of an epoxide, or an ester of the glycol with acetic acid or other lower aliphatic acid may be used.

In a convenient method for preparing the glycol dicarboxylate polyester, the dimethyl ester of the dicarboxylic acid is reacted with an excess of the glycol, preferably employing about 1.5 to 2.1 mols of the glycol per mol of the ester. A typical example is the reaction of ethylene glycol with dimethyl terephthalate. The reaction is usually carried out at atmospheric pressure, but higher or lower pressures may be used if desired. Following the ester interchange reaction, in which methanol is removed as a by-product, heating is continued under reduced pressure until the excess glycol is removed and the polycondensation reaction has proceeded to the desired degree. Normally, the reaction is continued until at least a trimer is produced, corresponding approximately to an inherent viscosity of about 0.1. If desired, however, polycondensation may be continued until a degree of polymerization of 200 or even higher is achieved, corresponding to an inherent viscosity of approximately unity. Small amounts of catalysts are usually added to facilitate the reaction, manganous acetate, calcium acetate, and sodium methoxide being typical ester interchange catalysts and antimony trioxide and zinc acetate being suitable polycondensation catalysts. Litharge, sodium hydrogen hexabutoxytitanate, and the tetra-alkyl titanates, such as tetraisopropyl titanate, are examples of catalysts which may be used for both the ester interchange and polycondensation steps.

In a separate reaction, 2,2,4,4-tetramethyl-1,3-cyclobutylene glycol or an ester-forming derivative thereof is reacted with a dicarboxylic acid or ester-forming derivative thereof. The 2,2,4,4-tetramethyl-1,3-cyclobutylene glycol, abbreviated hereinafter as TMCBG, may be employed as either the cis trans isomer or as a mixture of the isomers. Any of the various dicarboxylic acids listed above as suitable for the preparation of the glycol dicarboxylate polyester of Formula I, or a mixture of the acids, may also be employed to form the TMCBG dicarboxylate polyester of Formula II.

In a typical instance, TMCBG is reacted with dimethylterephthalate. The reaction mixture is heated to carry out the ester interchange reaction, following which the pressure is reduced and the temperature increased to bring about polycondensation. Sodium hydrogen hexabutoxytitanate or the titanate esters, e.g., tetraisopropyl titanate or tetrabutyl titanate, are preferred catalysts for polycondensations involving TMCBG. The polycondensation reaction is continued until at least a trimer is formed, corresponding approximately to an inherent viscosity of at least about 0.1. Generally, the reaction is continued until a somewhat higher level is achieved, up to a degree of polymerization of 200 or even somewhat higher as in the case of the preparation of the glycol dicarboxylate polyester described above.

To melt blend the glycol dicarboxylate and the TMCBG dicarboxylate polyesters so prepared, the dried ground polymer flakes of the two polyesters in the desired proportion can be mixed followed by melting of the flake mixture under an inert atmosphere and stirring to form a homogeneous melt. The molten polyesters may also be mixed directly with vigorous stirring. After at least about 10 minutes in the melt, preferably at least 30 minutes, the desired segmented copolyester is formed. If the molecular weight of the segmented copolyester is lower than desired, e.g., as the result of employing low molecular weight starting material segments, additional polycondensation can be carried out. To achieve a higher degree of polymerization, the melt blend segmented product is preferably solidified and ground to flake, following which the flake is heated below its melting point in a stream of inert gas to achieve solid phase polycondensation.

The segmented copolyesters of the invention are stable for several hours in the melt, especially at temperatures up to 280° C., and are thus highly suitable for processing in the melt without undergoing randomization within the time period normally required for extruding the molten polymer to form filaments or film.

The segmented copolyesters, as a class, are also relatively stable to alkaline hydrolysis. The tensile properties, crystallinity, and resistance to dry cleaning solvents of fibers prepared from the novel segmented copolyesters are generally comparable to the corresponding glycol dicarboxylate homopolyester; however, the dyeability of the fiber is greatly improved with respect to the corresponding glycol dicarboxylate homopolyester.

The following example will serve to illustrate the preparation and properties of the novel segmented copolyesters of the invention; although the example is not intended to be limitative.

The term "inherent viscosity," as used herein, is defined as the polymer property determined in accordance with the following relationship:

$$\eta_{inh.} = \frac{\ln \eta_{rel.}}{c}$$

wherein the relative viscosity, $\eta_{rel}$, is calculated by dividing the flow time in a capillary viscometer of a dilute solution of the polymer by the flow time for the pure solvent. The concentration ($c$) used in the example is 0.25 g. of polymer per 100 ml. of solution, and the measurements are made at 25° C. The solvent employed in the example comprises a mixture of 75% methylene chloride and 25% trifluoroacetic acid by volume.

As used herein, the "Polymer-Melt Temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers Inc., N.Y., pages 49–50 (1961).

EXAMPLE

*Segmented copolyester of polyethylene terephthalate (80%) and poly(2,2,4,4-tetramethyl-1,3-cyclobutylene terephthalate) (20%)*

A. PREPARATION OF POLYETHYLENE TEREPHTHALATE

A mixture of 4540 g. of dimethyl terephthalate (23.2 mols) and 3064 g. of ethylene glycol (49.4 mols) is heated in the presence of 13.6 g. of antimony trioxide and 20.4 g. of manganous acetate 4.5 $H_2O$. Evolution of methanol commences at 160° C. Heating is continued for 2 hours, at which time evolution of methanol ceases the final temperature being 230° C. Polycondensation is then carried out over a temperature range of 266° to 283° C. during a period of 3 hours while the pressure is reduced to 1.8 mm. of mercury. To ensure an inert atmosphere, a slow stream of nitrogen is passed into the reaction mixture during the polycondensation. The polyethylene terephthalate product has an inherent viscosity of 0.61 and a PMT of 255° C.

B. PREPARATION OF POLY(2,2,4,4-TETRAMETHYL-1,3-CYCLOBUTYLENE TEREPHTHALATE)

A catalyst solution of sodium hydrogen hexabutoxytitanate, $NaHTi(OBu)_6$, is prepared by dissolving 1 g. of sodium and 14.8 g. of tetrabutyl titanate in n-butanol to make 200 ml. of solution. A mixture of 36 g. of TMCBG (0.25 mol; 50/50 mixture of cis and trans isomers), 16.6 g. of dimethyl terephthalate (0.1 mol), and 1.5 ml. of the $NaHTi(OBu)_6$ catalyst solution is heated at 245° C. at atmospheric pressure for 17 hours with evolution of methanol. The pressure is then reduced to 0.7 mm. of mercury while the temperature is increased to 275° C., following which polycondensation is carried out for 19.5 hours at this temperature and pressure. The product, poly(2,2,4,4-tetramethyl-1,3-cyclobutylene terephthalate), has an inherent viscosity of 0.32 and a PMT of 239° C.

C. PREPARATION OF THE SEGMENTED COPOLYESTER

Forty g. of finely-divided polyethylene terephthalate is mixed with 10 g. of poly(2,2,4,4-tetramethyl-1,3-cyclobutylene terephthalate) in a 150-ml. round bottom flask fitted with a glass stirrer and a nitrogen inlet. The flask is blanketed with nitrogen and heated to 280° C. After a few minutes of heating and stirring at this temperature, a homogeneous melt is obtained. Heating and stirring are continued for a total of 15 minutes, after which the segmented copolyester product is cooled. It has a PMT of 248° C. and an inherent viscosity of 0.47. When a sample of the segmented copolyester is melted, maintained at a temperature of 248° C. for one hour, and then resolidified, it is found that its PMT remains unchanged.

A molten sample of the segmented copolyester is extruded at 270° C. to form a filament which is then oriented by drawing. The filament exhibits good dyeabiilty with 1,4-diamino-2,3-dichloroanthraquinone, a violet disperse dye, being more readily dyed than filaments of unmodified polyethylene terephthalate.

A film is melt pressed from the segmented copolyester. When boiled in 1% aqueous sodium hydroxide solution, its rate of weight loss is only half that of a film of unmodified polyethylene terephthalate.

A series of additional segmented copolyesters is prepared by stirring 10 g. of poly(2,2,4,4-tetramethyl-1,3- cyclobutylene terephthalate) and 40 g. of each of the following polyesters at 280° C. for 35 minutes:

Poly(p-hexahydroxylylene terephthalate)
Poly(bicyclohexyl-4,4'-dimethylene 4,4'-sulfonyldibenzoate)
Poly(ethylene 2,8-dibenzofurandicarboxylate)
Poly(1,3-cyclopentanedimethylene 4,4'-bibenzoate)
Poly(bicyclohexyl-4,4'-dimethylene decahydro-2,6-naphthalenedicarboxylate)
Poly(ethylene 4,4'-carbonyldibenzoate)
Poly(ethylene chloroterephthalate)

Since many different embodiments of the invention may be made without departing from the spirit and scope thereof, it is to be understood that the invention is not limited by the specific illustrations except to the extent defined in the following claim.

I claim:

A segmented linear copolyester having an inherent viscosity of at least 0.3, as determined at 25° C. for a solution of 0.25 g. of the copolyester dissolved in a mixture of 75 milliliters of methylene chloride and 25 milliliters of trifluoroacetic acid, and characterized by alternating first and second polyester segments connected through ester linkages, the first polyester segment consisting essentially of a succession of 3 to about 200 recurring structural units of ethylene terephthalate and the second polyester segment consisting essentially of a succession of 3 to about 200 recurring structural units of a 2,2,4,4-tetramethyl-1,3-cyclobutylene terephthalate, the weight ratio of said first polyester segment to said second polyester segment being in the range from 60/40 to 95/5.

References Cited by the Examiner

UNITED STATES PATENTS 2,936,324   5/1960   Hasek et al. _____ 260—617

FOREIGN PATENTS 1,303,888   8/1962   France.

MURRAY TILLMAN, *Primary Examiner.*
J. T. GOOLKASIAN, *Assistant Examiner.*